United States Patent
Loukas

(10) Patent No.: US 6,853,674 B1
(45) Date of Patent: Feb. 8, 2005

(54) VARIABLE WAVELENGTH IMPULSE TRANSMISSION

(76) Inventor: Pasi Into Loukas, Kemintie 969, Rovaniemi (FI), 96700

(*) Notice: Subject to any disclaimer, the term of this patent is extended or adjusted under 35 U.S.C. 154(b) by 786 days.

(21) Appl. No.: 09/587,270

(22) Filed: Jun. 5, 2000

Related U.S. Application Data

(60) Provisional application No. 60/171,137, filed on Dec. 20, 1999.

(51) Int. Cl.[7] .............................................. H04L 27/30
(52) U.S. Cl. ........................ 375/130; 375/256; 375/259
(58) Field of Search ................................. 375/150, 241, 375/256, 257, 295, 316

(56) References Cited

U.S. PATENT DOCUMENTS

| | | | | |
|---|---|---|---|---|
| 4,589,285 A | * | 5/1986 | Savit ............................. | 73/655 |
| 5,952,956 A | * | 9/1999 | Fullerton ...................... | 342/27 |
| 5,966,090 A | * | 10/1999 | McEwan ...................... | 342/27 |
| 6,026,125 A | * | 2/2000 | Larrick et al. ............... | 375/295 |
| 6,141,131 A | * | 10/2000 | Brooker et al. ............. | 398/201 |
| 6,391,021 B1 | * | 5/2002 | Mueller et al. ................ | 606/7 |
| 6,526,071 B1 | * | 2/2003 | Zorabedian et al. .......... | 372/20 |
| 6,549,567 B1 | * | 4/2003 | Fullerton ..................... | 375/219 |

* cited by examiner

*Primary Examiner*—Dac V. Ha

(57) ABSTRACT

A method for transmitting data without carrier wave, using one-cycle electromagnetic or electric impulses. Data is encoded in the transmission by modulating the impulse wavelength and optionally also the impulse position in a transmission interval. Also two different methods for receiving such impulses. The other amplifies the received impulse in multiple reception channels with AC impulses having different modulation states, the most intense amplified impulse is then filtered to find out the correct modulation state of the received impulse. The other measures the time difference between the positive and negative amplitude maximums of the AC equivalent of the received impulse to find out its correct wavelength modulation state. Also a method for organizing wireless communication traffic that uses presented transmission method, where different impulse wavelengths are allocated for different use.

13 Claims, 2 Drawing Sheets

FIG. 2
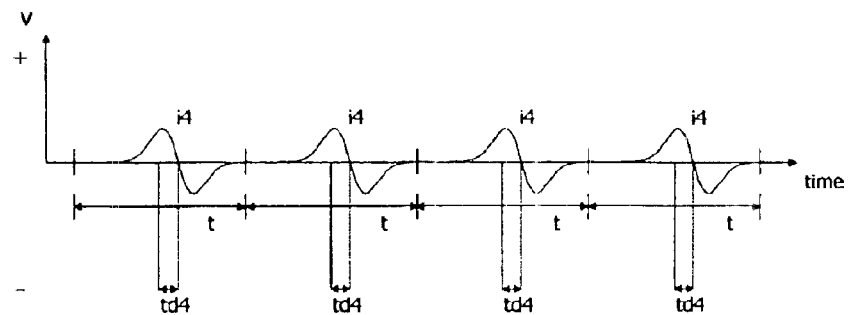
FIG. 2A
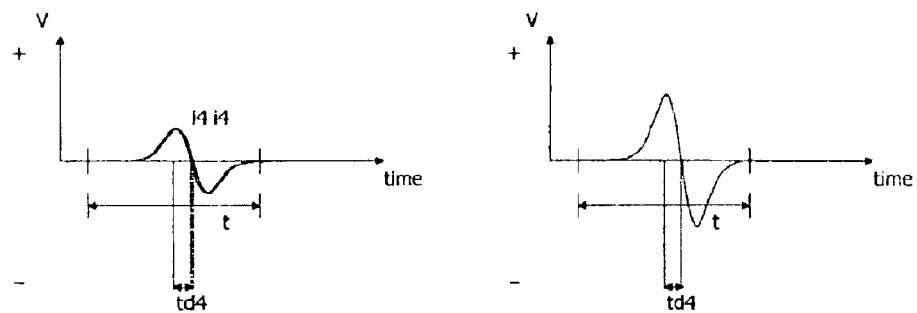
FIG. 2B
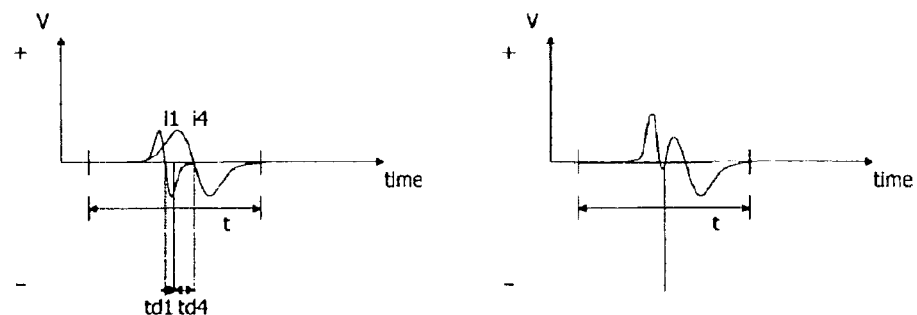
FIG. 2C

VARIABLE WAVELENGTH IMPULSE TRANSMISSION

Claims the benefit of provisional patent application No. 60/171,137 filed Dec. 20, 1999.

RELATED APPLICATIONS

Not Applicable

BACKGROUND OF THE INVENTION

The invention was conceived for the need to find a competitive transmission solution especially for wireless communications as an alternative for the industry monopolization.

DESCRIPTION OF THE PRIOR ART

Prior art covers impulse transmission without carrier wave, applying either radio or electrical impulses. Further, pulse width and pulse position modulation have wide use in signal processing.

SUMMARY OF THE INVENTION

A method for transmitting data without carrier wave, applying short variable wavelength one-cycle radio or electric impulses, plus method for receiving such impulses, plus method for organizing wireless traffic that uses said transmission system.

DESCRIPTION OF THE DRAWINGS

FIG. 2 depicts Variable Wavelength Impulse Transmission impulse reception process.

FIG. 2A depicts reception channel for the type i4 transmission impulse. Reception channel repeats continuously type i4 reception impulse.

FIG. 2B depicts reception of impulse. Transmission impulse is of type i4, and reception impulse is also of type i4 (left side of figure). The co-effect of the impulses produces an impulse with the highest possible amplitude (right side of figure).

FIG. 2C depicts reception of impulse. Transmission impulse is of type i1, and reception impulse is of type i4 (left side of figure). The co-effect of the impulses produces an impulse with relatively small maximum amplitude (right side of figure).

SPECIFICATION

Variable Wavelength Impulse Transmission Method

Figure 1:
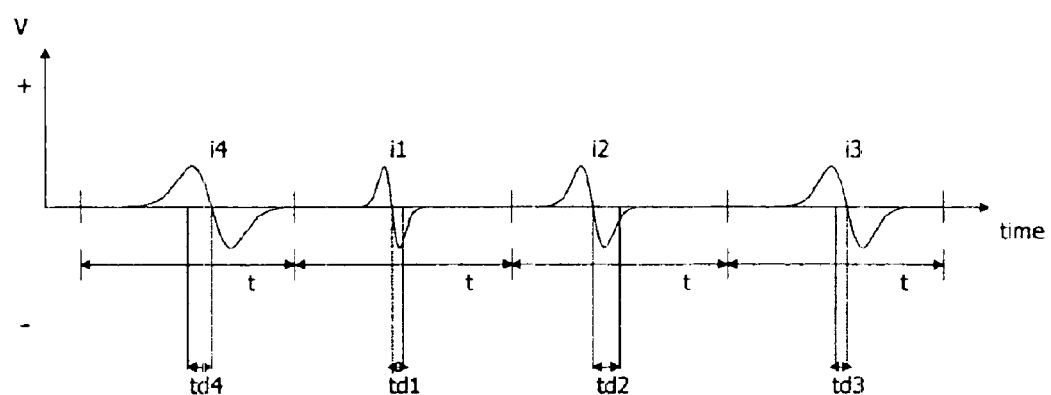
FIG. 1 depicts Variable Wavelength Impulse Transmission impulse cue. Impulses i1. . . i4 have each a unique wavelength. Impulses have their own positions inside interval t depicted by distances td1 . . . td4 of the centers of impulses from the center of each impulse's host interval.

In time axis, time is divided to equal length intervals t, each of them carrying single radio or electrical impulse, the center of the impulse being at distance td from the center of the interval t (refer FIG. 1). The impulses have alternatively A) a predetermined number of clearly separable wavelengths, or B) infinite number of wavelengths between predetermined minimum and maximum wavelengths. Data is encoded into transmission by choosing appropriate impulse wavelength according to the value of sequence of bits of data to be sent. In case A if there are number n separate impulse wavelengths, then one impulse is able to carry number of bits of data equal to 2-based logarithm of n. In case B the transmission principle is the same as in case A, except that there is no absolute limit how many bits of data one impulse can carry, it is limited only by the transmission device's ability to distinguish closely adjacent wavelength impulses.

The cue of impulses in transmission is divided into transmission channels either by taking every nth impulse for a single channel, or by setting a predetermined order path according to which the impulses are picked for each channel.

Impulse Distinguishing Method in Impulse Receiving Process

Impulses are distinguished in impulse receiving process either A) by determining the wavelength of each transmission impulse from the time difference between its positive and negative amplitude maximums, or B) by setting an own reception channel for each wavelength of impulse. In case A the transmission impulse's distance td from the transmission interval's center is zero. In case B the transmission impulse's distance td from the transmission interval's center is different for each impulse, either negative (the center of impulse is before the interval's center) or positive (the center of impulse is after the interval's center).

In case B each reception channel generates reception impulses that are of same wavelength, as with the impulses it is purported to receive (refer FIG. 2A). The reception impulses are repeated in the same intervals as the interval of the said transmission system, the center of the reception impulse being at same distance td from the center of interval t as with the transmission impulse it is meant to detect. The reception of an transmission impulse is detected as an co-amplitude effect or peak impulse which the transmission impulse and reception impulse form when they meet each other. The transmission impulse's actual wavelength is recognized by comparing the peak impulses of different reception channels and finding the peak impulse which has the greatest amplitude (refer FIG. 2B for a case where the transmission and reception signals are of same wavelength; and FIG. 2C for a case where the transmission and reception signals are of different wavelength).

Method for Organizing Wireless Transmission Traffic which Uses Variable Wavelength Impulse Transmission When using the said transmission system in wireless radio transmission data or voice communications, a single transmission channel is divided into several sub-channels by allocating different impulse wavelengths for different use if so needed. Impulse wavelengths are chosen for allocation according to the needed transmission power and the ability to pass obstacles of different wavelength impulses. The allocation is altered dynamically to optimize best overall transmission traffic every moment, when needed.

What is claimed is:

1. A variable wavelength impulse transmission method, comprising:

sending one-cycle electromagnetic impulse(s) without carrier wave;

wherein data is encoded in the transmission by choosing an appropriate wavelength for each of the impulses according to a respective value of data being sent;

receiving said impulses and decoding the data carried by them.

2. A variable wavelength impulse transmission according to claim 1, comprising:

wherein said impulses are sent in certain intervals;

wherein the data is optionally encoded in said transmission as a combination of wavelength encoding, and impulse position encoding, said impulse position encoding comprising choosing an appropriate position for each of said impulses in an impulse transmission interval according to the respective value of data being sent.

3. A variable wavelength impulse transmission method according to claim 2, comprising:

wherein it is reserved an own reception channel for each unique type of impulse used in said transmission according to the combination of the impulse wavelength and the impulse position in a transmission interval;

wherein a said reception channel amplifies the received impulse with an AC impulse that corresponds the impulse type for which said on channel is reserved;

wherein the amplified impulses are compared between reception channels to find the one which is the most intense, the right type of the received impulse being denoted as an assigned impulse type of the reception channel which yielded the most intense amplified impulse.

4. A variable wavelength impulse transmission method according to claim 3, comprising:

wherein it is used electric impulses instead of electromagnetic impulses in said transmission.

5. A variable wavelength impulse transmission according to claim 2, comprising:

wherein a cue of impulses in the transmission is divided in transmission channels either by assigning every nth impulse for a single channel, or by determining an order path according to which the impulses are assigned for each channel.

6. A variable wavelength impulse transmission method according to claim 2, comprising:

wherein the used impulse wavelengths are allocated between separate overlapping transmissions so that the transmissions interfere with each other as little as possible;

wherein the allocation is optionally done constantly in real-time.

7. A variable wavelength impulse transmission method according to claim 1, comprising:

wherein a wavelength of the received impulse is recognized by measuring a time difference between the positive and negative amplitude maximums of its AC equivalent.

8. A variable wavelength impulse transmission method according to claim 7, comprising:

wherein it is use electric impulses instead of electromagnetic impulses in said transmission.

9. A wireless communication system, comprising:

two wireless communication devices;

transmitting data between the devices;

wherein the transmission happens using one-cycle electromagnetic impulses which are sent without carrier wave;

wherein the transmitting device is capable to choose a wavelength for the impulses from among two or more different wavelengths.

10. A wireless communication system according to claim 9, comprising:

wherein said device are capable to transmit and receive data using simultaneously two or more different wavelengths of said impulses.

11. A wireless communication traffic organization system, comprising:

multiple wire communication devices;

wherein the devices use a transmission method, where data is transmitted without carrier wave, using one-cycle electromagnetic impulses;

wherein different impulse wavelengths are allocated for different use.

12. A wireless communication traffic organization system according to claim 11, comprising:

wherein the allocation is done so that an overlapping transmissions interfere with each other as little as possible;

wherein said allocation is optionally done constantly in real-time.

13. A wireless communication traffic organization system according to claim 11, comprising:

wherein said allocation is done according to an ability of different wavelength impulses to pass obstacles and/or according to a need transmission power of different wavelength impulses;

wherein said allocation is optionally done constantly in real-time.

* * * * *

UNITED STATES PATENT AND TRADEMARK OFFICE
CERTIFICATE OF CORRECTION

PATENT NO. : 6,853,674 B1
DATED : February 8, 2005
INVENTOR(S) : Pasi Into Loukas It is certified that error appears in the above-identified patent and that said Letters Patent is hereby corrected as shown below:

Column 2,
Line 62, after "transmission" insert -- method --.

Column 3,
Line 14, delete the word "on" and insert -- reception --.
Line 25, after "transmission" insert -- method --.

Column 4,
Line 3, "use" should read -- used --.
Line 16, "device" should read -- devices --.
Line 21, "wire" should read -- wireless --.

Signed and Sealed this

Twenty-third Day of August, 2005

JON W. DUDAS
*Director of the United States Patent and Trademark Office*